United States Patent
Gordeev et al.

(10) Patent No.: US 6,841,119 B1
(45) Date of Patent: Jan. 11, 2005

(54) METHOD TO OBTAIN A REFRACTORY COMPOSITE MATERIAL BASED ON CARBIDE

(75) Inventors: Sergey Konstantinovich Gordeev, St. Petersburg (RU); Leonid Yourevich Denisov, St. Petersburg (RU); Vladimir Vladimirivich Morozov, St. Petersburg (RU); Jan Cederstrom, Saltsjöbaden (SE); Thommy Ekstrom, Stockholm (SE)

(73) Assignee: FOC Frankenburg Oil Company Est., Vaduz (LI)

( * ) Notice: Subject to any disclaimer, the term of this patent is extended or adjusted under 35 U.S.C. 154(b) by 94 days.

(21) Appl. No.: 10/129,815

(22) PCT Filed: Nov. 8, 2000

(86) PCT No.: PCT/EP00/11025

§ 371 (c)(1),
(2), (4) Date: Sep. 13, 2002

(87) PCT Pub. No.: WO01/34535

PCT Pub. Date: May 17, 2001

(30) Foreign Application Priority Data

| Nov. 9, 1999 | (RU) | 99124175 |
| Apr. 7, 2000 | (RU) | 2000108845 |
| Jul. 19, 2000 | (RU) | 2000119016 |

(51) Int. Cl.$^7$ ............................................. C04B 41/88
(52) U.S. Cl. ........................ 264/642; 264/643; 264/653; 264/674; 164/198
(58) Field of Search ............................. 264/642, 643, 264/653, 674; 164/198

(56) References Cited

U.S. PATENT DOCUMENTS 4,097,275 A   6/1978   Horvath ........................ 75/203

FOREIGN PATENT DOCUMENTS

WO    WO 98/43926    10/1998

*Primary Examiner*—Sean Vincent
(74) *Attorney, Agent, or Firm*—Young & Thompson

(57) ABSTRACT

A method to obtain a refractory carbide-based composite material, in particular as an article of a predetermined shape includes the following steps: molding of a porous blank from a mixture of powders of at least one carbide-forming metal and/or non-metal and at least one carbide, the amount of carbide component in the mixture of powders not exceeding 90%, heat treating the obtained porous blank in a hydrocarbonous atmosphere containing one or more hydrocarbons until the increase in its mass reaches 2–42%, thereby obtaining a semi-product, and heating the obtained semi-product in a non-oxidizing medium at a temperature of 1000–2000° C.

21 Claims, No Drawings

METHOD TO OBTAIN A REFRACTORY COMPOSITE MATERIAL BASED ON CARBIDE

CROSS REFERENCE TO RELATED APPLICATION

This is the 35 USC 371 national stage of International Application PCT/EP00/11025 filed on 8 Nov. 2000, which designated the United States of America.

FIELD OF TECHNOLOGY

The present invention relates to the field of manufacturing a carbide-based refractory composite material and more particularly, to the method to manufacture a refractory composite article with predetermined shape and dimensions.

BACKGROUND OF THE INVENTION

A known method for obtaining a refractory composite article based on at least one refractory compound, includes the following stages (U.S. Pat. No. 3,725,015):

Mixing of powder refractory material, boride and/or carbide, with a carbon-containing substance.

Molding of a blank in a predetermined shape out of the mixture.

Heating of the obtained blank for extraction of carbon out of the carbon-containing substance.

Impregnation of the blank with a molten metal alloy comprising 75–99% vol. of at least one metal out of the group containing Si, Cr, Fe, Ni, Ti and 1–25% vol. of a metal or mixture of metals out of the group Al, Cu, Fe and 0–24% vol. of a metal contained in the initial refractory material.

This known method has a number of drawbacks. For instance, the use of organic substances as the source of carbon demands a high process temperature at the decomposition stage. Such decomposition occurs in the volume of the molded blank with release of great amount (up to 50% of bond mass) gaseous substances. It often causes defects (cracks) in the blank. Further more the use of reaction-active alloys at the impregnation means that, during the impregnation the alloy components interact with carbon and form solid carbides. The solid carbides block pores, thus impeding further impregnation as well as the formation of a pore less material with a uniform structure.

Another known method for obtaining a refractory composite material in the form of an article with predetermined shape is disclosed in Patent application PCT/EP97/01566 According to this method a porous blank, having a porosity of 20–60% vol., is being molded from a powder made out of a carbide-forming metal. Then the blank is being heat treated in atmosphere of gaseous hydrocarbon or hydrocarbon mixture at a temperature exceeding the temperature of their thermal decomposition until the weight of the blank has increased at least 3%. Next the semi-product is being impregnated with melt of a metal out of the group including the following metals: Ag, Au, Cu, Ga, Ti, Ni, Fe, Co or an alloy based on a metal out of this group.

As carbide-forming metal, a metal out of group IV, V or VI of the Periodic table is used, e.g. Ti, Zr, Hf, V, Nb, Ta, Cr, Mo and W. Heat treating is carried out in a hydrocarbonous atmosphere containing one or more hydrocarbons out of the group that comprises acetylene, methane, ethane, propane, pentane, hexane, benzene and their derivatives. As hydrocarbon mixture for heat treatment natural gas can be used. The scope of good properties allows the use of materials manufactured by this known method as refractory structural materials, erosion-resistant electrodes of plasmotrones, erosion-resistant heavy-current electric contacts, arc-suppressing elements, high-temperature heat accumulators, ablating heat-shielding materials and heat-resistant damping materials. As a rule, materials produced by this known method have a high specific density, which restricts the field of their application. When manufacturing an article according to this method, great care has to be given to the process parameters during the pyrocarbonization- and activation-heat treatments so that a distortion of the intermediate body, in form of warpage does not occur. The distortion that can occur is caused by the transformation of the carbide-forming agent to carbide, e.g. when Ti transforms to TiC.

SUMMARY OF THE INVENTION

It is an object of the present invention to develop a method assuring the production of a refractory composite material possessing as good or better characteristics as those of materials manufactured by the known methods but by a simpler, more controllable and less energy consuming process than the known methods. Molding of blank out of a powder mixture of carbide-forming metals and/or non-metals and their carbides (in contrast to the known concepts) offers a number of advantages First of all, the use of both carbides and metal and/or non-metal in the powder makes it easier to achieve a favorable size distribution of the powder particles in order to optimize the packing properties of the powder. It provides the possibility to optimize the composition and porosity of the blank even in case of restricted choice of carbide and metal and/or non-metal powders on the market. Secondly the use of mixtures of carbide and metal/non-metal carbide formers leads to a substantially decrease in the duration of the pyrocarbon heat treatment in comparison with prior art. Thirdly in contrast to prior art, the use of both carbide and carbide forming agent in the mixture makes it easier to keep the porous body and semi product free of any distortion occurring during the pyrocarbon- and activation-heat treatments, i.e. with less effort put on controlling the process it is possible to manufacture a high-quality article. It is also an object of the present invention to develop a method assuring the production of a refractory composite article possessing high physical and mechanical characteristics combined with low specific density. Such an article will also posses high hardness and good wear resistance, high thermal and electric conductivity and be able to work at elevated temperatures. The developed method will also give the possibility to change the listed properties by varying the proportion of the components and by varying the manufacturing parameters thus, obtaining articles having a wide field of properties and applications.

The present invention can be divided into the following steps

Molding of a porous blank having a porosity of 20–70%. The blank consisting of a powder mixture, containing at least one refractory carbide-forming metal and/or refractory carbide-forming non-metal and at least one carbide. The content of carbide in the powder mixture forming the blank does not exceed 90W %. The blank can contain an added temporary binder.

Heat treatment of the porous blank in an atmosphere of gaseous hydrocarbon or hydrocarbon mixture at a temperature exceeding the temperature of their thermal decomposition until the blank has increased 2–42/mass.

Heating of the obtained semi-product in a non-oxidizing medium at a temperature of 1000–2000° C.

Impregnation of the obtained semi-product by a melt of metal or alloy.

In the first embodiment of the claimed invention the porous blank is formed of a powder mixture consisting of at least one of the refractory carbide-forming elements in the group, Ti, Zr, Hf, V, Nb, Ta, Mo, Cr and W, and at least one carbide of the elements of said group. The porous blank has porosity in the range of 20–60%. Heat treatment in an atmosphere of gaseous hydrocarbon mixture is carried out until the blank increased 2–25% in mass. The obtained semi-product is heated in a non-oxidizing gas atmosphere (e.g. in vacuum or inert gas) at 1000–2000° C. and then impregnated with a melt either consisting of at least one element in the group; Si, Mg, Al, Ag, Au, Cu, Ga, Ti, Ni, Fe, Co or of an alloy based on at least one element of said group.

Another Embodiment of the claimed invention stresses the low-density properties as well as the possibility to use two different carbide formers. The porous blank, having a porosity of 30–70% vol., is formed of a mixture consisting of boron and/or silicon, and boron carbide and/or silicon carbide. The blank is subjected to heat treatment in an atmosphere of gaseous hydrocarbon or a mixture of hydrocarbons at a temperature exceeding the temperature of thermal decomposition of said hydrocarbon or hydrocarbon mixture until the blank has increased 8–42% in mass, then the semi-product is heated at 1300–1800° C. in an inert medium and impregnated with a melt of a element in the group; Si, Al, Mg and Cu or of an alloy based on at least one element of said group.

In all said embodiments forming of the blank can be carried out by any known method feasible in this case to obtain an article with necessary porosity, e.g. by pressing, slurry or tape casting.

In all said embodiments the blank can be formed in such a way that the pores are uniformly or non-uniformly (gradient) distributed through the volume of the blank. When forming a blank with uniform distribution of porosity, the impregnating metal, alloy or Si phase is distributed uniformly in the composite material. In the case of non-uniform distribution of porosity in the blank the distribution of the impregnating metal, alloy or Si phase will be non-uniform as well.

In all said embodiments the blanks are heat treated in an atmosphere of a gaseous hydrocarbon or hydrocarbon mixtures at a temperature exceeding their thermal decomposition temperature. When using a hydrocarbon or hydrocarbon mixture out of the group: acetylene, methane, ethane, propane, pentane, hexane, benzene and derivatives of the listed compounds the temperature is held in the range of 550–1200° C. When using natural gas as the hydrocarbon mixture optimum temperature range is 750–950° C.

In all said embodiments the impregnation is carried out in an inert atmosphere by dipping the semi-product into the melt or by melting an amount of metal alloy or Si on its surface.

DETAILED DESCRIPTION OF THE INVENTION

The method according to the present invention includes the following steps:

Forming of the porous blank with a porosity of 20–70% of a powder mixture containing at least one refractory carbide-forming agent, and at least one carbide. Content of carbide powder in the mixture does not exceed 90 W %.

Heat treatment of the porous blank in an atmosphere of gaseous hydrocarbon or hydrocarbon mixture at a temperature exceeding the temperature of their thermal decomposition until the mass of the blank has increased by 2–42%.

Heating of the obtained semi-product in a non-oxidizing medium at a temperature between 1000–2000° C.

Impregnation of the obtained semi-product with a melt consisting of one metal alloy or Si.

The porous blank is formed by using known forming methods, e.g. pressing, slurry casting or tape casting. The preferred range of porosity in the blank is 20–70% vol. the blank can be molded with a uniform distribution of pores through its volume or with a non-uniform (gradient) distribution of pores through its volume. When forming a blank with uniform distribution of porosity, the impregnating metal, alloy or Si phase is distributed uniformly in the composite material. In the case of non-uniform distribution of porosity in the blank the distribution of the impregnating metal alloy or Si phase will be non-uniform as well. The obtained porous blank is heated in an atmosphere of a gaseous hydrocarbon or hydrocarbon mixture at a temperature exceeding the temperature of decomposition of the hydrocarbon or hydrocarbon mixture. When using a hydrocarbon or hydrocarbon mixture out of the group acetylene, methane, ethane, propane, pentane, hexane, benzene and derivatives of the said compounds the temperature is held in the range of 550–1200° C. When using natural gas the optimum temperature range is 750–950° C. The heat treatment is carried out until the mass of the blank has increased by 2–42% The obtained semi-product is heated in a non-oxidizing gas atmosphere (e.g. in vacuum or inert gas) at 1000–2000° C. and then impregnated with a melt either consisting of at least one element in the group; Si, Mg, Al, Ag, Au, Cu, Ga, Tic Ni, Fe, Co or of an alloy based on at least one element of said group The manufacturing parameters depend upon the environment where the refractory composite material is to be placed as well as on what type of function the article is going to fulfill. Consequently the manufacturing parameters are varied from case to case. The properties of the article can be varied by choice of:

The composition of the powder mixture used for molding of the blank;

The hydrocarbon or mixture of hydrocarbon used at the stage of heat treatment;

The substance used for impregnation.

The particle size distribution of the initial metal and/or non-metal and carbide powders are chosen according to the desired porosity formation in the blank (volumetric content and the size of the pores).

Description Step By Step

The porous blank is formed by using known forming methods, e.g. pressing, slurry casting or tape casting. The use of carbides and metal and/or non-metal in the powder makes it easier to achieve a favorable size distribution of the powder particles in order to optimize the packing properties of the powder. It provides the possibility to optimize the composition and porosity of the blank even in case of restricted choice of carbide and metal and/or non-metal powders on the market. The preferred range of porosity in the blank is 20–70% vol. At porosity below 20% the processes of molding, heat treatment and impregnation are impeded. The fact that the impregnation is impeded means that the content of metal or Si phase in the obtained composite material is small, thus the advantages of this type of material connected with presence of metal phase cannot be realized in full measure. Porosity above 70% is not advisable because reduced content of carbide skeleton in the composite material deteriorates the properties of the composite material.

For articles such as filters and catalyst substrates that have lower demands on the mechanical strength or lower demands on the metal phase, porosities outside the above mentioned range can be used. However, a skeleton carbide body having a lower porosity than 8% or a higher porosity than 75 will have a too poor performance to be useful.

Use of powder mixtures with a carbide content of more than 90 W % is not advisable since it leads to a physically weak semi-product. The amount of carbon being deposited is determined by the amount of available non-carbide precursor to react with. Consequently a to high percentage of carbide in the powder mixture leads to the semi-product not having enough strength to endure the following steps in the manufacturing process.

The blank can be molded with a uniform distribution of pores through its volume or with a non-uniform (gradient) distribution of pores through its volume. When forming a blank with uniform distribution of porosity, the impregnating metal phase is distributed uniformly in the composite material. In the case of non-uniform distribution of porosity in the blank the distribution of the impregnating metal phase will be non-uniform as well.

The proportions between the components when mixing the powder are exemplified below for Ti and Si/B:

When using Ti and TiC the proportions varies as follows, numbers given in mass %: Titanium 30–99 and Titanium carbide 1–70.

When using Ti, TiC and a temporary binder the proportions varies as follows, numbers given in mass %: Titanium 29–98, Titanium carbide 1–69 and Temporary binder 1–5.

When using Si and/or B and SiC and/or $B_4C$ the proportions varies as follows, numbers given in mass %: Boron or silicon or a mixture of them 30–99 and Boron carbide or Silicon carbide or a mixture of them 1–70

When using Si and/or B and SiC and/or $B_4C$ and a temporary binder the proportions varies as follows, numbers given in mass %: Boron or silicon or a mixture of them 30–98, Boron carbide or Silicon carbide or a mixture of them 1–70 and Temporary binder 1–5.

The porous blank manufactured from the powder mixture is then transformed into a carbide skeleton by means of a chemical synthesis of carbide carried out in the volume of the blank. For this purpose synthesis of pyrocarbon is firstly carried out in pores of the blank. Pyrocarbon is formed in the volume of the blank according to the following chemical reaction:

$$C_mH_n = mC + n/2 H_2 \quad (3)$$

Therefore the process is carried out under conditions when reaction (3) is displaced to the right, i.e. at temperatures exceeding decomposition temperature of the hydrocarbon in question. In order to provide uniform pyrocarbon formation in all the pores of the blank a balance must be kept between the decomposition rate and the diffusion coefficients in the pores. Such a balance is achieved by determining the optimum temperature for each combination of porous body and pyrocarbon source. When using hydrocarbons out of the group: acetylene, methane, ethane, propane, pentane, hexane, benzene and their derivatives it is advisable to choose a temperature in the range of 550–1200° C., when using natural gas optimum temperature lies in the range of 750–950° C. During the pyrocarbon part of the heat treatment an increase in mass of the blank takes place, this increase is determined by the deposition conditions and the duration of the heat treatment.

The desired mass increase of the blank is in each specific case calculated from the stoichiometric proportion between metal/non metal and carbon in the carbide ($M_mC_n$) that is to be formed, using the following dependence:

$$\Delta m = m_0 \cdot \alpha \cdot (M_c \cdot v/M) \cdot K \quad (1)$$

Where:

$\Delta m$—mass change of the blank;

$m_0$—initial mass of the blank;

$\alpha$—amass portion of metal/non-metal in the mixture;

$M_c$, M—mole masses of carbon and metal/non-metal forming the carbide;

v—correlation of stoichiometric coefficients v=n/m in chemical formula of carbide $M_m C_n$;

K— non-stoichiometricity coefficient, $0.5 \leq K \leq 1$.

Equation 1 is used when using powders of one carbide-forming metal/non-metal as well as when using several carbide-forming metals/non-metals. In the later case the calculation is carried out applying equation (1) for each one of the metals/non-metals.

When using a mixture containing a temporary binder it is more convenient to use another dependence:

$$\Delta m = m_0 \cdot [1/(1+\beta)](M_c \cdot v/M) \cdot K \quad (2)$$

Where β is the ratio between mass of carbide and mass of metal/non-metal in the mixture.

The increasing mass of the porous body will change the shape of this body in a micro-scale perspective, the porosity thereof being reduced. However, in a macro-scale perspective the shape and size of the porous body formed at the molding will not undergo any noticeable change. The semi-product obtained after the pyrocarbon process has thus in macro-scale perspective the same shape and size as the porous body obtained in the molding process.

The Preferable range of blank mass change in the atmosphere of hydrocarbons is 2–42%. At blank mass changes less than 2% a substantial deformation of the semi-product takes place at the following stage (heating in non-oxidizing medium). The material has not enough carbon acting as a binding agent to be able to withstand the high stresses experienced at the heat treatment. A blank mass change by more than 42% results in an excess of carbon that has been deposited during the pyrocarbon process, which is not being synthesized into carbide. This excess of free carbon reduces the wetability between pores and metal at the impregnation step, which in the end, results in the deterioration of the properties of the final composite material.

The use of mixtures of carbide and metal/non-metal carbide formers leads to a substantial decrease in the duration of the pyrocarbon heat treatment in comparison with prior art. This decrease is connected with the fact that these mixtures of precursor substances are faster transformed into the required composition during the heat treatment than mixtures consisting of only metal/non-metal carbide formers are. The decrease in needed time for the heat treatment can be understood by an analysis of equation (1). When using carbide—metal mixtures the value of a becomes less than 1, α decreases with increase in mass share of carbide in the mixture. It can be seen from equation (1) that Δm decreases when α decreases. As a result of a decreased change in the blank mass, the duration of the heat treatment becomes shorter. As an example, the period of heat treatment for a blank formed from titanium powder is 23 hours. This period is sufficient to reach the stoichiometric Ti:C ratio. While the period of heat treatment for a blank consisting of 50% Ti and 50% TiC is 11 hours, at the same conditions (see Examples no. 3, 4). When decreasing the duration of the process also the amount of energy and reagents consumed by the process are being decreased. Thus the cost of the process is reduced.

When the pyrocarbon synthesis has been completed the semi-product represents a chemically meta-stable system consisting of partly carbide-forming metal and/or non-metal and partly deposited carbon, these two constituents are able to react and form carbides. The reaction is activated by temperature. Therefore, the semi-product is heated in a non-oxidizing atmosphere (e.g. in vacuum or argon) to a temperature between 1000–2000° C. for a time sufficient for formation of secondary carbide. As a rule, this time is at least 15 min and depends on composition and size of the semi-product. The carbide is being synthesized by the reaction between metal and/or non-metal and carbon resulting in a body consisting completely of carbide, the body having a three-dimensional skeleton structure. The degree of porosity in the carbide skeleton obtained by this method being 15–60% vol. and practically all pores have an open structure.

When the intention is to use the material/article as a filter, the material/article is now ready for use.

In contrast to prior art the use of carbide-metal/non-metal mixtures prevents or significantly decreases the risk of a deformation of the porous body and semi product during the pyrocarbon- and activation-heat treatments. The use of carbide particles in the powder prevents or significantly decreases the strain that can be built up in the material when the carbide-forming element is being transformed to carbide. This strain has its origin in the shape and size difference between the crystal-structure of the carbide-former and the crystal-structure of the carbide, e.g. the transformation of Ti to TiC cause deformation of the body during the transformation process of the metal/non-metal particles into carbide. A body less prone to shape changes during the manufacturing make it possible to simplify the control of the heating processes. It makes it possible to accelerate the process at the step of heating as well as decrease the requirements on the temperature controlling equipment. Hence the method becomes easier to manage, shorter in time and requiring less expensive equipment.

Impregnation of the carbide skeleton body by the metal, alloy or Si melt is carried out in a non-oxidizing atmosphere (e.g. vacuum or argon) by dipping the carbide skeleton body into a melt or by melting of a amount of metal, alloy or Si on the surface of the carbide skeleton body. Capillary forces fill the pores of the carbide skeleton body until all the pores are completely filled by the melt. The temperature at the stage of impregnation depend on the melting point of the metal alloy or Si, e.g. for Cu the temperature is held between 1300–1350° C., for a Cu—Ga alloy (4:1) the temperature is held between 1000–1050° C., for a Ti—Ni alloy the temperature is held between 1250–1300° C. and so on. The preferred content of metal or Si phase after the impregnation process is 15–60% vol. When the metal, alloy or Si has so-lidified a composite material is obtained having a structure consisting of two interpenetrating continuous spatial skeletons, the refractory carbide structure and the metal, alloy or Si structure, offering a wide range of properties for various fields of application. Even at very high application temperatures, over the melting point of the metal, alloy or Si phase, the body retains its load-beaming properties. When the temperature rises over the melting point of the metal, alloy or Si phase the capillary forces keep the melt inside the article.

When the intention is to use the material/article as a catalyst, the walls of the open pores in the semi-product are coated with a metal layer. The layer consists of at least one metal, or an alloy based on at least one metal, from the group: Ag Cu, Ga, Ti, Ni, Fe and Co. Elements such as V, Cr, Pt, and Pd can be added to the alloy that is used coating the walls of the catalyst article.

Properties

As pointed out earlier in the text the semi-product obtained after the pyrocarbon process has the same shape and size as the porous body obtained in the molding process. Therefore not only composite material but also articles can be produced, the shape and dimension of such an article is determined by the shape and dimension of the blank. The finished composite materials manufactured by this method are hard and consequently difficult to machine. But both the blank and the semi-product manufactured by this method are possible to machine, which make the machining substantially easier. Thus at production of complicated shaped articles it is advisable to do any machining before impregnation.

An article made out of powder of at least one metal out of the group: Ti, Zr, Hf, V, Nb, Ta, Cr, Mo, W as outlined above has properties as high stability under intensive heat flows, self-lubrication at dry friction, high damping ability, air arc resistance etc.

When TiC is used in the carbide skeleton structure and Ti, Al or Mg in the impregnating melt properties as high specific strength and rigidity, low specific density, high strength at elevated temperatures, low coefficient of linear expansion, high electric and thermal conductivity and air arc resistance are received.

An article where the blank is made of a mixture of boron and/or silicon, and boron carbide and/or silicon carbide, and the impregnating melt is from the group: Si, Al, Mg, Cu or an alloy on the basis of one or more of these element has properties as high specific strength and rigidity, high strength at elevated temperatures, low coefficient of linear expansion, self-lubrication effect under conditions of dry friction and so on. Additional unique properties are low specific density when the impregnating elements are Al, Mg, or Si. Additional properties when the impregnating element is Cu are high electric and thermal conductivity, air arc resistance.

SUMMARY

The set of unique properties make it possible to use the composite materials manufactured by the claimed method as refractory, structural, wear-resistant, erosion-resistant, tribotechnical (friction, antifriction), refractory damping materials as well as ablating heat-protection materials, including those with low density and high specific strength and rigidity.

Materials obtained by the claimed method retain high strength even at high temperatures. At temperatures exceeding melting point of metal component their strength corresponds to strength of carbide skeleton. The materials retain their shape in the range of high temperatures (unlike matrix composite materials which completely lose their shape at temperatures exceeding melting point of metal). After cooling the material recovers its structure and properties because the melt has been retained in the carbide skeleton by capillary forces. Such a set of properties make application of these materials promising for moving parts of internal combustion engines, pumps, compressors, such as pistons and their components, components of cam drives, valves, valve followers, connecting rods etc. The articles can be used as components of parts or as inserts in the parts in places most subjected to wear of various natures.

Articles of materials with aluminum, copper, alloys on the basis of these metals in pure state as metal phase can find application as electrodes and contacts of electric equipment subjected to effect of arc, components of friction couples, components of shaft face packing etc.

Very important advantages of the claimed invention are the following:

First of all, the use of carbides and metal and/or non-metal in the powder makes it easier to achieve a favorable size distribution of the powder particles in order to optimize the packing properties of the powder. It provides the possibility to optimize the composition and porosity of the blank even in case of restricted choice of carbide and metal and/or non-metal powders on the market.

Secondly the use of mixtures of carbide and metal/non-metal carbide formers leads to a substantially decrease in the duration of the pyrocarbon heat treatment in comparison with prior art.

Thirdly in contrast to prior art, the use of both carbide and carbide forming agent in the mixture makes it easier to keep the porous body and semi product free of any distortion occurring during the pyrocarbon- and activation-heat treatments, i.e. with less effort put on controlling the process it is possible to manufacture a high-quality article.

THE ESSENCE OF THE INVENTION IS DISCLOSED IN THE FOLLOWING EXAMPLES

Example 1

Out of a mixture comprising 49% mass. of amorphous boron powder, 49% mass. of boron carbide powder with particle size 30 µm and 2% mass. of a temporary bonding agent (phenol formaldehyde resin SF 10-A) a blank is formed by pressing in the shape of parallelepiped, the dimensions being 5×6×50 mm. The pores of the blank (porosity of 51% vol.) are uniformly distributed through the volume. The blank is then placed in an isothermal reactor for pyrocarbon synthesis and is being heat-treated in an atmosphere of natural gas at 870° C. The increase of mass that will take place during the heat treatment is calculated beforehand by equation (2) using the following values for the parameters:

$\beta=0.5; K=1$.

The blank is treated in the reactor for 3.2 hours, until the in this example desired mass increase of 13.88%, has been reached. Then the semi-product is placed into a vacuum furnace, being heated to 1650° C. and held at this temperature for 20 minutes. Furthermore, impregnation of the porous blank is carried out by dipping it into a melt of Al-12%Si alloy in the vacuum furnace at a temperature between 1150–1200° C. After this an article is obtained with the same dimensions as those of the initial blank. The article comprises 55% vol. of boron carbide and 45% vol. of the alloy (Al-12%/Si).

The material of the article possesses the following properties: Density ($\rho$)—2.56 g/cm$^3$, hardness HRC—55, dynamic modulus of elasticity (E)—215 GPa, flexural strength at 20° C.—402 MPa, at 200° C.—395 MPa, at 400° C.—225 MPa, at 500° C.—195 MPa, and at 600° C.—45 MPa Specific modulus of elasticity (E/9.81$\rho$)—8.46×10$^3$ km.

One ought to pay attention to the very low density of the material and high specific rigidity, which are several times greater than these parameters are in other materials. As well as to the temperature dependence of the flexural strength which indicates a substantial excellence of this material when compared to conventional low-density alloys which cannot be used, as a rule, at temperatures above 400° C.

Example 2

Out of a mixture comprising 83.3% mass. of amorphous boron powder, 14.7% mass. of boron carbide powder with particle size 100 µm and 2% mass. of temporary binder (a mixture of polyvinylpyrrolidone, polyethylene glycol and oleic acid) a blank is formed by pressing. The blank having the shape of a cylinder with the diameter 15 mm and the height 20 mm. Porosity of the blank is 65% vol. The obtained blank is heat treated in an atmosphere of natural gas at the temperature 850° C. until the increase in mass reaches 23%. Then the se-product is placed into a vacuum furnace, heated to 1650° C. and held at this temperature during 20 min. Further, impregnation of the porous blank is carried out by melting of a weight of alloy Al-12%/Si on the surface of the porous blank in the vacuum furnace at the temperature 1150–1200° C. After this an article is obtained with the same dimensions as those of the initial blank. The article consists of 44% vol. boron carbide and 56% vol. alloy (Al-12%Si).

The article possesses the following properties: density —2.55 g/cm$^3$, hardness HRC—40, heat conductivity at 20° C.—72 W/m.K, heat capacity at 20° C.—950 J/kg.K, heat conductivity at 300° C.—53 W/m.K, heat capacity at 300° C.—1200 J/kg.K.

Example 3

Out of mixture consisting of 49.5% mass titanium-powder, 49.5%/mass titanium-carbide-powder and 1% mass temporary binder phenol formaldehyde resin SF 10-A) a blank is formed by pressing in the shape of parallelepiped with dimensions 5×6×50 mm Porosity of the blank is 52% vol. uniformly distributed through the volume. The obtained blank is placed into a isothermal reactor for pyrocarbon synthesis and heat treated in atmosphere of natural gas at the temperature 870° C. for 11 hours until the increase of its mass reaches 12.5%. Then the semi-product is placed into vacuum furnace, heated to 1580° C. and held at this temperature during 20 min. Further, impregnation of the porous blank is carried out by dipping into melt of alloy Al-12%/Si in the vacuum furnace at the temperature 1150–1200° C. After this an article is obtained with the same dimensions as those of the initial blank. The article consists of 48.5% vol. titanium carbide and 51.5% vol. alloy (Al-12%Si).

The article possesses the following properties: Density ($\rho$)—3.7 g/cm$^3$, hardness HRC—31, dynamic modulus of elasticity (E)—196 GPa, flexural strength—435 MPa, specific modulus of elasticity (E/9.81$\rho$)—8.46×10$^3$ km.

Example 4

Out of mixture consisting of 99%/mass. titanium powder and 1% mass. temporary binder (phenol formaldehyde resin SF 10-A) a blank is formed. Note this example is not included by the scope of this invention since it does not include the use of carbide in the powder that forms the blank. This example is used as one part in an illustration of the time gain that can be made when using carbide in the powder. A blank in the shape of a disc with the diameter 20 mm and the height 3 mm is formed by pressing. Then the blank is heat treated in atmosphere of natural gas at the temperature 870° C. for 23 hours until the increase in mass reaches 24.8%. Then the blank is placed into vacuum furnace, heated to 1580° C. and held at this temperature during 20 min. Further, impregnation is carried out by melting of a weight of aluminum, Mark A7 (Al≧99.7%), on the surface of the porous semi-product in the vacuum furnace at the temperature 1200–1250° C. The article consists of. 50% vol. titanium-carbide and 50% vol. aluminum.

Material of the article possesses the following properties: Density (ρ)-3.79 g/cm³, hardness HRC-18.

Example 5

Out of a mixture of titanium (16 μm) and titanium carbide (10 μm) taken in mass proportion 1:1 and 1% mass. of temporary bond (phenol formaldehyde resin SF 10-A) a blank in the shape of parallelepiped with dimensions 5×5× 50 mm is formed by pressing. Porosity of the blank is 50% vol. uniformly distributed through the volume. The obtained blank is placed into an isothermal reactor for pyrocarbon synthesis and heat treated in an atmosphere of natural gas at the temperature 870° C. The blank is held in the reactor for 10 hours until the increase in mass reaches 12%. Then the semi-product obtained is placed into vacuum furnace, heated to 1650° C. and held at this temperature during 15 min. Further, the obtained porous carbide skeleton is impregnated with an equiatomic alloy of nickel and titanium in the vacuum furnace at the temperature 1300° C. by melting of a weight of the alloy on the surface of the blank during 5 minutes. The obtained composite material consists of 51% vol. titanium carbide and 49% vol. nickel-titanium alloy.

The article possesses the following properties: density— 5.5 g/cm³, hardness HRA—82, dynamic modulus of elasticity—230 GPa, a strength at 3-point bending at 20° C. of—520 Mpa and the crack resistance $K_{IC=}15$ Mpa. $m^{1/2}$.

Properties of the material in al the experiments were determined by the following methods:

1. Density was determined by hydrostatic method.
2. Hardness—by Rockwell method
3. Dynamic modulus of elasticity—by resonance frequency method
4. Flexural strength—by three-point bending method.
5. Crack resistance—by critical coefficient of stresses.
6. Heat conductivity and heat capacity—by monotonous heating method.

What is claimed is:

1. A method of manufacturing a refractory carbide-based composite material, which comprises:
   molding a porous blank from a powder mixture of at least one carbide-forming metal and/or non-metal and at least one carbide; the amount of carbide component in the powder mixture not exceeding 90% by weight;
   heat treating the obtained porous blank in a hydrocarbonous atmosphere containing one or more hydrocarbons until the blank has increased 2–42% in mass, thereby obtaining a semi-product; and
   heating the obtained semi-product in a non-oxidizing medium at a temperature of 1000–2000° C. to obtain a heated semi-product.

2. The method according to claim 1, further comprising impregnating the heated semi-product with a metal or alloy melt.

3. The method according to claim 2, wherein the powder mixture comprises at least one carbide-forming agent selected from a first group consisting of: Ti, Zr, Hf, V, Nb, Ta, Cr, Mo, W, Si, B and at least one carbide out of said first group; the heat treatment of the obtained porous blank in a hydrocarbonous atmosphere is carried out until the mass increase reaches 2–25%; and the heated semi-product is impregnated with a melt of at least one element selected from a second group consisting of: Ag, Au, Cu, Ga, Ti, Ni, Fe, Co, Si or an alloy based on at least one element from said second group.

4. The method according to claim 2, wherein the powder mixture contains titanium and titanium carbide; the heat treatment of the obtained porous blank is carried out until the mass increase reaches 7–25%; the heating of the obtained semi-product is carried out at a temperature of 1300–1600° C., and the heated semi-product is impregnated with a melt of at least one element selected from the group consisting of: Al, Mg, Si or alloy based on at least one element from said group.

5. The method according to claim 4, wherein the powder mixture includes the following proportions of components in mass %:

| titanium | 30–99 |
|---|---|
| titanium carbide | 1–70. |

6. The method according to claim 4, wherein the powder mixture further includes a temporary binder and the following proportions of components in mass %:

| titanium | 29–98 |
|---|---|
| titanium carbide | 1–69 |
| temporary binder | 1–5. |

7. The method according to claim 2, wherein the powder mixture contains a mixture of boron and/or silicon and boron carbide and/or silicon carbide; the heat treatment of the obtained porous blank is carried out until the mass increase reaches 8–42%6; the obtained semi-product is heated at a temperature range of 1300–1800° C.; and the heated semi-product is impregnated with melt of at least one element selected from the group consisting of: Al, Mg, Cu, Si or alloy based on at least one element from said group.

8. The method according to claim 7, wherein the powder mixture includes the following proportions of components in mass %:

| boron and/or silicon | 30–99 |
|---|---|
| boron carbide and/or silicon carbide | 1–70. |

9. The method according to claim 7, wherein the powder mixture further includes a temporary binder and the following proportions of components in mass %:

| boron and/or silicon | 29–98 |
|---|---|
| boron carbide and/or silicon carbide | 1–69 |
| temporary binder | 1–5. |

10. The method according to claim 6, wherein the temporary binder comprises phenolformaldehyde resin or a mixture of polyvinylpirrolydone, polyethylene glycol and oleic acid.

11. The method according to claim 7, wherein the blank has a porosity of 30–70% by volume.

12. The method according to claim 4, wherein the blank has a porosity of 30–60% by volume.

13. The method according to claim 1, wherein the blank has a porosity of 20–60% by volume.

14. The method according to claim 1, wherein the blank has a porosity, which is uniformly distributed through its volume.

15. The method according to claim 1, wherein the blank has a porosity, which is non-uniformly distributed through its volume.

16. The method according to claim 1, wherein the molding of the blank is carried out by pressing or slip casting or slurry casting.

17. The method according to claim 1, wherein the heat treatment is carried out in an atmosphere of natural gas at a temperature of 750–950° C.

18. The method according to claim 1, wherein the heat treatment is carried out in an atmosphere of at least one hydrocarbon selected from the group consisting of acetylene, methane, ethane, propane, pentane, hexane, benzene and derivatives thereof at a temperature of 550–1200° C.

19. The method according to claim 2, wherein the impregnating is made either by dipping the heated semi-product into the melt of a metal, alloy or Si, or by melting an amount of a metal, alloy or Si on the surface of the heated semi-product.

20. The method according to claim 19, wherein the heated semi-product is totally or partly saturated in the impregnating step.

21. The method according to claim 2, wherein the walls of the pores in the heated semi-product are coated by a metal or an alloy in the impregnating step.

* * * * *